US010184062B2

(12) United States Patent
Einsla et al.

(10) Patent No.: US 10,184,062 B2
(45) Date of Patent: *Jan. 22, 2019

(54) PAPER COATING COMPOSITION

(71) Applicants: Dow Global Technologies LLC, Midland, MI (US); Rohm and Haas Company, Philadelphia, PA (US)

(72) Inventors: Brian R. Einsla, Collegeville, PA (US); Valeriy V. Ginzburg, Midland, MI (US); Lanfang Li, Somerset, NJ (US); John A. Roper, III, Midland, MI (US); Rebecca Smith, Ambler, PA (US); Jian Yang, Lake Jackson, TX (US)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 155 days.

This patent is subject to a terminal disclaimer.

(21) Appl. No.: 15/366,100

(22) Filed: Dec. 1, 2016

(65) Prior Publication Data

US 2017/0158902 A1 Jun. 8, 2017

Related U.S. Application Data

(60) Provisional application No. 62/263,159, filed on Dec. 4, 2015.

(51) Int. Cl.
| | |
|---|---|
| C09B 67/00 | (2006.01) |
| C08G 61/04 | (2006.01) |
| C09D 125/14 | (2006.01) |
| D21H 19/58 | (2006.01) |
| D21H 15/10 | (2006.01) |
| G03C 1/79 | (2006.01) |
| C09D 7/65 | (2018.01) |
| C09D 7/40 | (2018.01) |
| B41M 5/44 | (2006.01) |

(52) U.S. Cl.
CPC ............. *C09D 125/14* (2013.01); *C09D 7/65* (2018.01); *C09D 7/68* (2018.01); *C09D 7/69* (2018.01); *C09D 7/70* (2018.01); *D21H 15/10* (2013.01); *D21H 19/58* (2013.01); *G03C 1/79* (2013.01); *B41M 5/44* (2013.01); *B41M 2205/04* (2013.01); *B41M 2205/38* (2013.01); *C08L 2207/53* (2013.01)

(58) Field of Classification Search
CPC .... C09D 125/14; C09D 7/125; C09D 7/1275; C09D 7/1291; C09D 7/1283; C09D 7/70; C09D 7/68; C09D 7/65; C09D 7/69; D21H 19/58; D21H 15/10; C08L 2207/53; B41M 2205/38; B41M 2205/04; G03C 1/79
USPC .................................. 522/502, 500, 1; 520/1
See application file for complete search history.

(56) References Cited

U.S. PATENT DOCUMENTS

| | | | |
|---|---|---|---|
| 4,925,827 A | 5/1990 | Goto et al. | |
| 6,020,435 A | 2/2000 | Blankenship et al. | |
| 6,531,183 B1 | 3/2003 | Cason et al. | |
| 6,780,820 B2 | 8/2004 | Bobsein | |
| 8,334,047 B2 | 12/2012 | Kelly et al. | |
| 9,932,487 B2 * | 4/2018 | Einsla | ............... C09D 7/1291 |
| 2001/0036990 A1 * | 11/2001 | Bobsein | ............... C08F 265/04 |
| | | | 524/425 |
| 2002/0072560 A1 * | 6/2002 | Bardman | ............... C08F 257/02 |
| | | | 524/501 |

FOREIGN PATENT DOCUMENTS

WO 2008008509 A2 1/2008

OTHER PUBLICATIONS

Injection Molding, Dec. 31, 2005, The Materials Analyst, Part 69: Density, bulk density, melt density, and specific gravity, Plastics Today, 1-8 (Year: 2005).*

* cited by examiner

*Primary Examiner* — Jessica Whiteley
(74) *Attorney, Agent, or Firm* — Reid S. Willis

(57) ABSTRACT

The present invention relates to a coating composition comprising an aqueous dispersion of a binder and first and second core-shell polymer particles having aqueous neutralized acid cores, wherein the dry bulk density of the first core-shell polymer particles is in the range of 0.25 to 0.5 g/mL; and the dry bulk density of the second core-shell polymer particles is in the range of 0.30 to 0.90 g/mL. The composition of the present invention is useful as an undercoat layer for a thermosensitive recording material.

8 Claims, No Drawings

PAPER COATING COMPOSITION

BACKGROUND OF THE INVENTION

The present invention relates to a composition suitable as an undercoat layer for paper coated with a thermosensitive recording layer.

The use of undercoats for thermosensitive recording materials is known to prevent undesirable absorption of ink into the paper and to provide thermal insulation for the paper. Consequently, coated paper produces sharper brighter images and has better reflectivity than uncoated paper.

U.S. Pat. No. 6,531,183 discloses a coating composition comprising binder and hollow pigment particles for improving gloss in paper. The coating composition may optionally comprise second pigment particles that may be solid or "vacuolated" and may be the same or different size as the first particles.

U.S. Pat. No. 6,780,820, discloses a variety of undercoats including those containing, inorganic pigments used in above critical pigment volume concentration coatings, fine organic single voided particles, or multivoided particles.

U.S. Pat. No. 8,334,047 discloses the use of an undercoat derived from a composition comprising a binder and a bimodal distribution of first and second hollow polymeric pigments with acid-free hydrophilic cores and with volume mean diameters generally in the range of 300 to 1,100 nm.

It would be an advance in the art of undercoating composition technology to find a material suitable for use as an undercoat that provides a balance of strength of the paper coating and the optical density of the printed paper coated with the undercoat and a thermo sensitive recording layer.

SUMMARY OF THE INVENTION

In a first aspect, the present invention is a coating composition comprising an aqueous dispersion of a binder and first and second core-shell polymer particles having aqueous neutralized acid cores, wherein
  a) the first core-shell polymer particles have a diameter in the range of from 1.0 µm to 1.8 µm;
  b) the second core-shell polymer particles have a diameter in the range of from 0.25 µm to 1.0 µm;
  c) the number ratio of the second to the first core-shell polymer particles is in the range of from 1:1 to 20:1;
  d) the diameter of the second core-shell polymer particles is in the range of from 15 to 65% of the diameter of the first core-shell polymer particles;
  e) the dry bulk density of the first core-shell polymer particles is in the range of 0.25 to 0.5 g/mL; and
  f) the dry bulk density of the second core-shell polymer particles is in the range of 0.30 to 0.90 g/mL.

In a second aspect, the present invention is thermosensitive recording material comprising paper, an undercoat layer disposed on the paper, and a thermosensitive recording layer disposed on the undercoat layer, wherein the undercoat layer comprises a binder and a bimodal distribution of first and second hollow sphere polymer particles, wherein
  a) the first hollow sphere particles have a diameter in the range of from 1.0 µm to 1.8 µm;
  b) the second hollow sphere particles have a diameter in the range of 0.25 to 1.0 µm;
  c) the number ratio of the second to the first hollow sphere polymer particles is in the range of from 1:1 to 20:1;
  d) the diameter of the second core-shell polymer particles is in the range of from 15 to 65% of the diameter of the first core-shell polymer particles;
  e) the dry bulk density of the first hollow sphere polymer particles is in the range of 0.25 to 0.5 g/mL; and
  f) the dry bulk density of the second hollow sphere polymer particles is in the range of 0.30 to 0.90 g/mL.

The present invention addresses a need in the art by providing a composition that is useful as an undercoat showing improved strength and improved optical density for a thermosensitive recording material applications.

DETAILED DESCRIPTION OF THE INVENTION

In a first aspect, the present invention is a coating composition comprising an aqueous dispersion of a binder and first and second core-shell polymer particles having aqueous neutralized acid cores, wherein
  a) the first core-shell polymer particles have a diameter in the range of from 1.0 µm to 1.8 µm;
  b) the second core-shell polymer particles have a diameter in the range of from 0.25 µm to 1.0 µm;
  c) the number ratio of the second to the first core-shell polymer particles is in the range of from 1:1 to 20:1;
  d) the diameter of the second core-shell polymer particles is in the range of from 15 to 65% of the diameter of the first core-shell polymer particles;
  e) the dry bulk density of the first core-shell polymer particles is in the range of 0.25 to 0.5 g/mL; and
  f) the dry bulk density of the second core-shell polymer particles is in the range of 0.30 to 0.90 g/mL.

The binder is the film-forming component of the coating composition and is not limited in its scope. Examples of binders include polymeric binders such as polyacrylics, polyvinyl acetates, (poly)vinyl-acrylics, (poly)styrene-acrylics, (poly)styrene-butadiene, (poly)vinyl acetate/ethylene, (poly)vinyl-acrylics, polyurethanes, polyacrylamides, polyvinyl alcohols, and polyesters. The weight fraction of the binder for the composition of the present invention is typically in the range of 2 to 50, more preferably to 30 weight percent, based on the weight of the composition.

The composition further comprises first and second core-shell polymer particles having aqueous neutralized acid cores. These particles are known as hollow sphere particles or opaque polymers and can be prepared by methods known in the art. (See, for example, U.S. Pat. No. 6,020,435).

The first core-shell polymer particles have a diameter in the range of from 1.0 µm, preferably from 1.2 µm, more preferably from 1.3 µm, and most preferably from 1.4 µm to 1.8 µm, preferably to 1.7 µm, and more preferably to 1.6 µm. The second core-shell polymer particles have a diameter in the range of from 0.25 µm, preferably from 0.3 µm, more preferably from 0.35 µm, and most preferably from 0.4 µm, to 1 µm, preferably to 0.8 µm, more preferably to 0.6 µm, and most preferably to 0.5 µm.

Particle diameters for a) the first core-shell polymer particles and b) for the second core-shell polymer particles with particles sizes from 500 nm to 1 µm are, by definition, the diameter that is measured by Leica light microscopy using a 100× oil immersion lens with a 1.63 numerical aperture; each diameter reading is made by on screen reading of the edge-to-edge distance of the greatest distance through the center of the particles and is averaged over at least 10 particles.

Particle diameters for the second core-shell polymer particles with particle sizes from 250 nm to less than 500 nm is, by definition, that diameter that is measured using a BI90Plus particle size analyzer.

The first core-shell polymer particles are further characterized by a dry bulk density in the range of from 0.25, preferably from 0.30, more preferably from 0.35 g/mL to 0.5, preferably to 0.45, and more preferably to 0.40 g/mL. An example of a commercial product suitable for use as an aqueous dispersion of first core-shell polymer particles is ROPAQUE™ TH-2000 Opaque Polymer (a Trademark of The Dow Chemical Company or its Affiliates). Dry bulk density is measured in accordance with the procedure disclosed in U.S. Pat. No. 6,020,435, Column 16, lines 10-67 to Column 17, lines 1-7.

The second core-shell polymer particles are further characterized by a dry bulk density in the range of from 0.30, preferably from 0.40, more preferably from 0.50, and most preferably from 0.55 g/mL, to 0.90, preferably to 0.80, more preferably to 0.75, and most preferably to 0.65 g/mL. An example of a commercial product suitable for use as an aqueous dispersion of second core-shell polymer particles is ROPAQUE™ ULTRA E Opaque Polymer.

The number ratio of the second to the first core-shell polymer particles is in the range of from 1:1, preferably from 2:1, more preferably from 3:1, and most preferably from 4:1, to 20:1, preferably to 15:1, more preferably to 12:1; and most preferably to 10:1.

The diameter of the second core-shell polymer particles is in the range of from 15, preferably from 20, more preferably from 25, most preferably from 27 percent, to 65, preferably to 40, more preferably to 33, and most preferably to 30 percent of the diameter of the first core-shell polymer particles. By way of example, if the first core-shell polymer particles have a diameter of 1.5 µm and the second core-shell polymer particles have a diameter of 425 nm, the diameter of the second core-shell polymer particles is 0.425/1.5 or 28.3% of the diameter of the first core-shell polymer particles.

The total pigment volume concentration (PVC) of the first and second core-shell polymer concentration, when the composition is applied as a film, is typically in the range of from 50 to 98%, preferably to 95%. Preferably, the PVC of the film is above critical. It has been discovered that undercoats with surprising strength can be prepared at above-critical PVCs.

The composition of the present invention may include other inorganic or polymeric pigments such as calcium carbonate, calcined kaolin, $TiO_2$, ZnO, $Al(OH)_3$, $BaSO_4$, and $SiO_2$, but may be practiced in the absence of ancillary pigments. The composition may also include other additives such as defoamers, crosslinking agents, surface active agents, and thermofusible materials, but may be practiced in the absence of ancillary additives.

The coating composition of the present invention is useful as an undercoat (intermediate first layer) for thermosensitive recording layer disposed on paper. Accordingly, in a second aspect, the present invention is a thermosensitive recording material comprising paper, an undercoat layer disposed on the paper, and a thermosensitive recording layer disposed on the undercoat layer, wherein the undercoat layer comprises a binder and first and second hollow sphere polymer particles, wherein the first hollow sphere particles have a diameter in the range of from 1.0 µm, preferably from 1.1 µm, more preferably from 1.3 µm, and more preferably from 1.4 µm, to 1.8 µm, preferably to 1.7 µm, and more preferably to 1.6 µm; wherein the second hollow sphere particles have a diameter in the range of from 0.25, preferably from 0.3 µm, more preferably from 0.35 µm, and most preferably to 0.4 µm, to 1 µm, preferably to 0.8 µm, preferably to 0.6 µm, and most preferably to 0.5 µm; wherein the number ratio of the second to the first hollow sphere polymer particles is in the range of from 1:1, preferably from 2:1, more preferably from 3:1, and most preferably from 4:1, to 20:1, preferably to 15:1, and more preferably to 12:1; and wherein the diameter of the second hollow sphere polymer particles is in the range of from 15, preferably from 20, more preferably from 25, most preferably from 27 percent, to 65, preferably to 40, more preferably to 33, and most preferably to 30 percent of the diameter of the first hollow sphere polymer particles.

The first hollow sphere polymer particles are further characterized by a dry bulk density in the range of from 0.25, preferably from 0.30, more preferably from 0.35 g/mL to 0.5, preferably to 0.45, and more preferably to 0.40 g/mL. The second hollow sphere polymer particles are further characterized by a dry bulk density in the range of from 0.30, preferably from 0.40, more preferably from 0.50, and most preferably from 0.55 g/mL, to 0.90, preferably to 0.80, more preferably to 0.75, and most preferably to 0.65 g/mL.

The undercoat layer can be applied to the paper by any of a variety of means such as roll applicator, wet applicator, curtain coater, or jet methods. The undercoat layer may be smoothed by any of a variety of methods including a blade, an air knife, a smooth rod, a grooved rod, or a wire wound rod. The final dried coat weight of the undercoat layer is typically in the range of from 1, more preferably from 2 $g/m^2$, to 25, more preferably to 10, and most preferably to 6 $g/m^2$.

A thermosensitive recording layer, which typically comprises a leuco dye (see U.S. Pat. No. 4,929,590), is then applied over the undercoat layer, typically at a thickness in the range of from 1 $g/m^2$ to 20 $g/m^2$, more preferably to 10 $g/m^2$. The thermosensitive recording layer may also comprise a variety of other additives including binders, fillers, crosslinking agents, surface active agents, and thermofusible materials.

EXAMPLES

Example 1—Preparation of a Bimodal Hollow Pigment Formulation

A slurry of ROPAQUE™ TH-2000 Opaque Polymer (1.5 µm diameter, 151.8 g, 31.9 g dry weight, dry bulk density 0.36 g/mL, void fraction 65%) was added to a vessel with stirring followed by addition of a slurry of ROPAQUE ULTRA E Opaque Polymer (0.4 µm diameter, 3.07 g, 0.95 g dry weight, dry bulk density 0.58 g/mL, void fraction 45%), followed by addition of RHOPLEX™ P-308 Styrene-Acrylic Binder (30.47 g, 15.16 g dry weight, 13.5% volume fraction), then polyvinyl alcohol (13.45 g, 1.95 g dry weight, 1.5% volume fraction) then water (1.2 g) to form an aqueous suspension having a solids content of 25 weight %. The PVC of the dried coating prepared from the formulation was 85% (with TH-2000 accounting for 83.4% and ULTRA E accounting for 1.6%) and the number ratio of TH2000 to ULTRA E was ~1:1.

The number of particles per gram of dry pigment is calculated by first calculating the volume (V) of a single particle and then converting volume to mass using the known dry bulk density (d) of the pigment particles to obtain the mass of a single particle:

$$V = 4/3 \pi r^3$$

$$m = V \times d$$

The number of particles per g is simply 1/m. Using this approach, the number ratio of ULTRA E and TH-2000 were calculated as follows:

$5.15 \times 10^{13}$ particles/g ULTRA E$\times 0.95$ g ULTRA E=$4.9 \times 10^{13}$ particles of ULTRA E $1.57 \times 10^{12}$ particles/g TH-2000$\times 31.9$ g TH-2000=$5.0 \times 10^{13}$ particles TH-2000

ULTRA E:TH-2000~1:1

A series of formulations were made varying the pigment amounts as shown in Table 1. For Examples 2-11 and C2, the total PVC of the dry coating was 87.5% with the binder and the polyvinyl alcohol amounts remaining the same and accounting for the remaining 12.5%. Water additions were adjusted to maintain a solids content of ~25%. ULTRA E # fraction refers to the number fraction of ULTRA E with respect to TH-2000. Volume fraction refers to the volume fraction of ULTRA E with respect to TH-2000. C1-C3 refer to comparative examples 1-3.

TABLE 1

ULTRA E Number Fraction and Volume Fraction with Respect to TH-2000

| Ex. # | ULTRA E #fraction | Ratio of ULTRA E to TH-2000 | Volume fraction |
| --- | --- | --- | --- |
| C1 | 0 | 0:1 | 0 |
| 1 | 0.5 | 1:1 | 0.02 |
| 2 | 0.67 | 2:1 | 0.04 |
| 3 | 0.75 | 3:1 | 0.05 |
| 4 | 0.80 | 4:1 | 0.07 |
| 5 | 0.83 | 5:1 | 0.09 |
| 6 | 0.86 | 6:1 | 0.10 |
| 7 | 0.88 | 7:1 | 0.12 |
| 8 | 0.89 | 8:1 | 0.13 |
| 9 | 0.9 | 9:1 | 0.15 |
| 10 | 0.91 | 10:1 | 0.16 |
| 11 | 0.99 | 100:1 | 0.65 |
| C2 | 0.999 | 1000:1 | 0.95 |
| C3 | 1 | — | 1 |

The formulations were used to form undercoats as described in the following section.

Preparation of an Undercoat

The samples were coated on paper as follows: A 9"×12" sheet of paper (weight 72 g/m²) was placed on a drawdown machine and secured with a clip on the top. A strip of scotch tape was applied across the top of the paper to be coated to prevent the subsequently applied coating from leaching through the paper. A wire wound rod was laid across the top of the paper above the tape, and a bead of coating was laid across the paper on the tape using a pipette. The rod was moved down the paper to coat the paper evenly to form an undercoat layer (weight ~4 to 4.5 g/m²). The coated sheets were placed on a piece of cardboard and dried for 1 min at 80° C., then removed from the oven and allowed to equilibrate for 2 h in a controlled temperature and humidity room (CTR) set to 22° C. and 50% relative humidity.

Coating Strength Measurements

Coating strength was measured with an IGT printability tester in accordance with ASTM T-499 su-64. The results of the test are reported in terms of viscosity-velocity-product (IGT-VVP), which is a measure of coating strength. Table 2 shows the relationship between the number fraction of small opaque polymers (ULTRA E) and the coating strength, as manifested by IGT-VVP.

TABLE 2

IGT-VVP as a Function of ULTRA E Number Fraction

| Ex. # | ULTRA E #fraction | Ratio of ULTRA E to TH-2000 | IGT-VVP |
| --- | --- | --- | --- |
| C1 | 0 | 0:1 | 7 |
| 1 | 0.5 | 1:1 | 11 |
| 2 | 0.67 | 2:1 | 16 |
| 3 | 0.75 | 3:1 | 17 |
| 4 | 0.8 | 4:1 | 36 |
| 5 | 0.83 | 5:1 | 28 |
| 6 | 0.86 | 6:1 | 36 |
| 7 | 0.88 | 7:1 | 36 |
| 8 | 0.89 | 8:1 | 38 |
| 9 | 0.9 | 9:1 | 40 |
| 10 | 0.91 | 10:1 | 40 |
| 11 | 0.99 | 100:1 | 11 |
| C2 | 0.999 | 1000:1 | 8 |
| C3 | 1 | — | 8 |

The results demonstrate that the bimodal formulation improves coating strength, with the greatest improvement occurring over the ULTRA E number fraction range of 0.80 to 0.95.

Preparation of Thermal Print Layer

The undercoated paper samples were coated with ~3.5 g/m² thermal imaging material containing leuco dye and a developer using substantially the procedure used to prepare the undercoat.

Optical Density Measurements

The coated papers were printed in accordance with ASTM F1405-98(2013); an Atlantek Paper Tester Model 200 was used. The conditions for printing using an Atlantek thermal printer were as follows: 50% checkerboard pattern, sequence dot pulse duration up to 0.8 ms, Tcycle=5.000 ms. The printhead resistance was 629 ohms with an applied voltage of 21.5 V. The printed thermal paper optical density of the coated paper was measured at 0.4 mJ/dot using an X-Rite 428 handheld spectrodensitometer.

Table 3 illustrates the effect of number fraction of small opaque polymers (ULTRA E) to OD print optical density

TABLE 3

Print Optical Density as a Function of ULTRA E Number Fraction

| Ex. # | ULTRA E #fraction | Ratio of ULTRA E to TH-2000 | OD |
| --- | --- | --- | --- |
| C1 | 0 | 0 | 1.01 |
| 1 | 0.50 | 1:1 | 1.03 |
| 2 | 0.67 | 2:1 | 1.20 |
| 5 | 0.83 | 5:1 | 1.07 |
| 10 | 0.91 | 10:1 | 1.10 |
| 11 | 0.99 | 100:1 | 1.01 |
| C3 | 1 | — | 0.93 |

The data show that a balance of IGT-VVP strength and optical density can be achieved by adjusting the ULTRA E fraction to a range of from about 0.67 to about 0.91.

Preparation of non-Hollow Polystyrene Beads

Three batches of aqueous dispersions of non-hollow polystyrene beads with different diameters were prepared to demonstrate the effect of particle size ratios on coating strength as follows.

Preparation of 200-nm Polystyrene Beads (PS1)

A 4-necked round bottom flask equipped with a mechanical stirrer and reflux condenser was charged with DI water (1535 g) and heated to 92° C. To this flask was added ammonium persulfate (4 g in 90 g water) and a seed latex (104.5 g, 41% solids, 60 nm). A monomer emulsion containing DI water (815 g), sodium dodecylbenzene sulfonate (25.5 g, 22.5% solids), styrene (1256 g) and methacrylic acid (38.87 g) was added over 120 min. An ammonium persulfate solution (2 g in 120 g water) wan concurrent with the monomer emulsion feed. During the course of the reaction the temperature was maintained at 88° C. Following the completion of the feeds, an additional quantity of ammonium persulfate solution (0.5 g in 30 g water) was added over 15 min. The reaction was then cooled to 75° C. and a solution of ferrous sulfate (32.4 g, 0.15% active was charged). Residual monomers were reduced by feeding a solution of t-butylhydroperoxide (0.80 g in 25 g water) and isoascorbic acid (1.10 g in 25 g water). The resulting dispersion had a solids content of 32.4% and a particle size of 187 nm.

Preparation of 300-nm Polystyrene Beads (PS2)

The 300-nm beads were prepared substantially as described for the preparation of the 200-nm beads except for the seed latex (105.4 g, 45% solids, 100 nm). The resulting dispersion had a solids content of 31.8% and a particle size of 286 nm.

Preparation of 400-nm Polystyrene Beads (PS3)

The 400-nm beads were prepared substantially as described for the preparation of the 200-nm beads except for the seed latex (133.7 g, 32% solids, 143 nm). The resulting dispersion had a solids content of 31.7% and a particle size of 407 nm.

Particle Size Ratio Effects

Particle size ratios were found to have a notable effect on coating strength, which can be measured using hollow or non-hollow spheres. Table 3 shows the effect of particle diameter of the second (smaller) polymer particles on IGT-VVP. In each of these experiments, the first (larger) polymer particles were 1.5 μm, the PVC was 87.5%, and the small particle number fraction was 0.91. Name refers to the name of the dispersion of small polymer particles; OP-96 refers to ROPAQUE™ OP-96 Opaque Polymer; AF-1055 refers to ROPAQUE™ AF-1055 Opaque Polymer (a Trademark of The Dow Chemical Company or its Affiliates). Styrene 1, 2, and 3 all non-hollow sphere beads that were prepared as described above. Ratio refers to the ratio of the small particle diameter to the large particle diameter.

TABLE 4

The Effect of Particle Size Ratio on Coating Strength

| Small Particle diameter (μm) | Name | Ratio | IGT-VVP |
|---|---|---|---|
| 1 | AF-1055 | 0.67 | 8 |
| 0.5 | OP-96 | 0.33 | 32 |
| 0.42 | ULTRA E | 0.28 | 36 |
| 0.41 | PS1 | 0.27 | 29 |
| 0.29 | PS2 | 0.19 | 15 |
| 0.19 | PS3 | 0.13 | 12 |

The results demonstrate that the strongest coatings are formed with small to large particle ratios around 0.28.

The invention claimed is:

1. A coating composition comprising an aqueous dispersion of a binder and first and second core-shell polymer particles having aqueous neutralized acid cores, wherein
   a) the first core-shell polymer particles have a diameter in the range of from 1.0 μm to 1.8 μm;
   b) the second core-shell polymer particles have a diameter in the range of from 0.25 μm to 1.0 μm;
   c) the number ratio of the second to the first core-shell polymer particles is in the range of from 1:1 to 20:1;
   d) the diameter of the second core-shell polymer particles is in the range of from 15 to 65% of the diameter of the first core-shell polymer particles;
   e) the dry bulk density of the first core-shell polymer particles is in the range of 0.25 to 0.5 g/mL; and
   f) the dry bulk density of the second core-shell polymer particles is in the range of from 0.30 to 0.90 g/mL.

2. The coating composition of claim 1 wherein the first core-shell polymer particles have a diameter in the range of from 1.2 μm to 1.8 μm; and the second core-shell polymer particles have a diameter in the range of from 0.3 μm to 0.8 μm; wherein the number ratio of the second to the first core-shell polymer particles is in the range of from 2:1 to 15:1; wherein the diameter of the second core-shell polymer particles in the range of from 20 to 40% of the diameter of the first core-shell polymer particles.

3. The coating composition of claim 2 wherein the first core-shell polymer particles have a diameter in the range of from 1.3 μm to 1.7 μm; and the second core-shell polymer particles have a diameter in the range of from 0.35 μm to 0.6 μm; wherein the number ratio of the second to the first core-shell polymer particles is in the range of from 3:1 to 12:1; wherein the diameter of the second core-shell polymer particles in the range of from 25 to 33% of the diameter of the first core-shell polymer particles.

4. The coating composition of claim 3 the second core-shell polymer particles have a diameter in the range of from 0.4 μm to 0.5 μm; wherein the number ratio of the second to the first core-shell polymer particles is in the range of from 4:1 to 10:1; wherein the diameter of the second core-shell polymer particles is in the range of from 27 to 30% of the diameter of the first core-shell polymer particles; and wherein the first core-shell polymer particles have a diameter in the range of from 1.4 μm to 1.6 μm.

5. The coating composition of claim 2 wherein the dry bulk density of the first core-shell polymer particles is in the range of 0.30 to 0.45 g/mL; and the dry bulk density of the second core-shell polymer particles is in the range of 0.40 to 0.80 g/mL.

6. The coating composition of claim 3 wherein the dry bulk density of the first core-shell polymer particles is in the range of 0.35 to 0.40 g/mL; and the dry bulk density of the second core-shell polymer particles is in the range of 0.50 to 0.75 g/mL.

7. The coating composition of claim 4 wherein the dry bulk density of the first core-shell polymer particles is in the range of 0.35 to 0.40 g/mL; and the dry bulk density of the second core-shell polymer particles is in the range of 0.55 to 0.65 g/mL.

8. The coating composition of claim 1 wherein the first and second core-shell polymer particles have a total pigment volume concentration in the range of from 50 to 98%.

* * * * *